No. 849,786. PATENTED APR. 9, 1907.
C. HILDENBRAND.
GUN CLEANING IMPLEMENT.
APPLICATION FILED MAR. 9, 1906.

WITNESSES:

INVENTOR
C. Hildenbrand.
BY
O'Meara & Brock
ATTORNEYS

UNITED STATES PATENT OFFICE.

CHARLES HILDENBRAND, OF PHŒNIXVILLE, PENNSYLVANIA.

GUN-CLEANING IMPLEMENT.

No. 849,786.  Specification of Letters Patent.  Patented April 9, 1907.

Application filed March 9, 1906. Serial No. 305,121.

*To all whom it may concern:*

Be it known that I, CHARLES HILDENBRAND, a citizen of the United States, residing at Phœnixville, in the county of Chester and State of Pennsylvania, have invented a new and useful Gun-Cleaning Implement, of which the following is a specification.

This invention relates to gun-cleaners, and more particularly to swab-holder attachments for the same, the object being to provide a swab-holder which can be adjusted to fit any size gun desired.

Another object of my invention is to provide a swab-holder with very simple means for attaching a piece of emery-cloth or cleaning fabric.

With these objects in view my invention consists in the employment of threaded stems provided with a flange at one end, a thumb-screw at the other, between which a rubber sleeve is arranged adapted to be expanded to fit different-size guns.

This invention consists of the novel features of construction hereinafter fully described, and pointed out in the claim.

Figure 1:
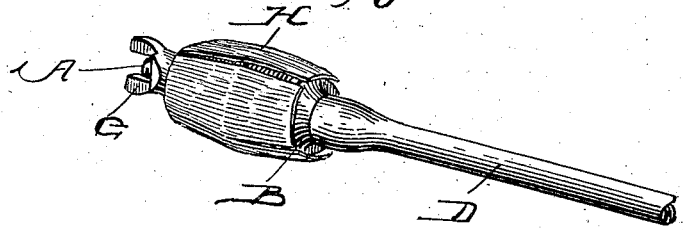
Figure 2:
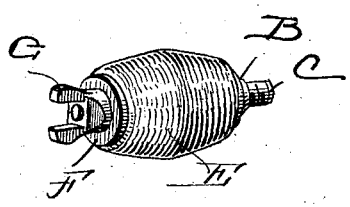
Figure 3:
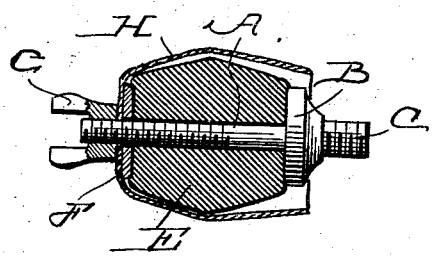
Figure 5:
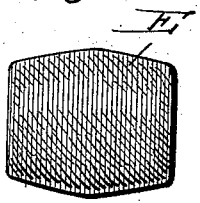
Figure 4:
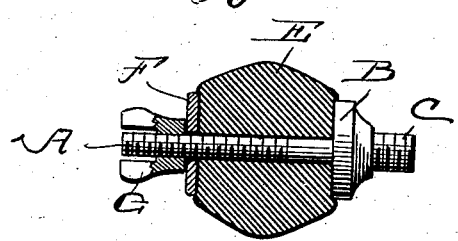
Figure 6:
Figure 7:
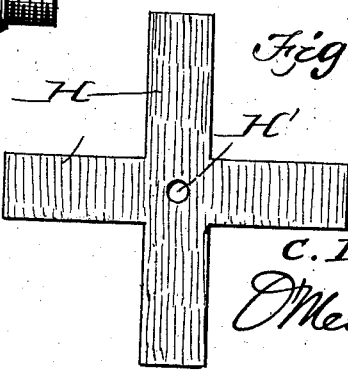

In the drawings forming a part of this specification, Figure 1 is a perspective view of my improved swab-holder, showing it attached to a rod and the emery-cloth secured thereon. Fig. 2 is a perspective view of the swab-holder detached. Fig. 3 is a longitudinal sectional view of the swab-holder with the emery-cloth attached. Fig. 4 is a longitudinal sectional view with the emery-cloth detached. Fig. 5 is a side view of the rubber sleeve. Fig. 6 is a side view of the stem and thumb-screw. Fig. 7 is a plan view of the emery-cloth.

Referring to the drawings, A indicates a threaded stem having a collar B, formed on one end, provided with a threaded enlarged projection C, adapted to be screwed into the threaded socket of the ordinary cleaning-rod D. Mounted on the stem A is a rubber sleeve E, formed larger at the center and tapering toward its ends. A washer F is arranged on the outer end of the stem, adapted to be forced up against the sleeve by a thumb-screw G and expand the same when it is desired to make the swab larger to fit a larger gun. A piece of emery-cloth H, provided with a central opening H', preferably formed in the shape shown in Fig. 7, is adapted to be secured on the stem between the washer F and the thumb-screw G and fits over the rubber sleeve when rust is to be removed from the barrel. It will also be seen that a piece of cloth can be secured on the stem in the same manner and used for cleaning the barrels with great advantage, as the sleeve can be expanded so as to make the cloth fit as tight against the barrel as desired, so as to remove every particle of dirt.

From the foregoing description it will be readily seen that I have provided a very simple and cheap device which can be attached to any cleaning-rod now in use and one which can be adjusted to fit any size gun desired.

Having thus fully described my invention, what I claim as new, and desire to secure by Letters Patent, is—

A swab-holder comprising a threaded stem having a collar at one end provided with a threaded projection adapted to be secured in a threaded socket of a cleaning-rod, a rubber sleeve widest at the center tapering toward its ends arranged on said stem, a washer engaging said sleeve, a thumb-nut working on the ends of the stem and a cleaning fabric adapted to be secured between the washer and nut, for the purpose described.

CHARLES HILDENBRAND.

Witnesses:
CLIFFORD DUNBAR,
MICHAEL O'NEILL, Jr.